United States Patent
Green

(10) Patent No.: US 11,564,376 B2
(45) Date of Patent: Jan. 31, 2023

(54) PET FOOD RECEPTACLE ANCHOR SYSTEM AND METHOD

(71) Applicant: Jabari Green, Columbia, SC (US)

(72) Inventor: Jabari Green, Columbia, SC (US)

(*) Notice: Subject to any disclaimer, the term of this patent is extended or adjusted under 35 U.S.C. 154(b) by 643 days.

(21) Appl. No.: 16/230,307

(22) Filed: Dec. 21, 2018

(65) Prior Publication Data

US 2019/0116755 A1 Apr. 25, 2019

Related U.S. Application Data

(63) Continuation-in-part of application No. 15/408,547, filed on Jan. 18, 2017, now Pat. No. 10,180,152.

(51) Int. Cl.
*A01K 5/01* (2006.01)
*A01K 7/00* (2006.01)

(52) U.S. Cl.
CPC .......... *A01K 5/0135* (2013.01); *A01K 7/005* (2013.01)

(58) Field of Classification Search
CPC ..... Y10T 403/32475; Y10T 403/32483; Y10T 403/4608
USPC ... 248/684, 156, 216.1, 216.4, 217.2, 217.3, 248/217.4, 218.1, 218.2, 346.01, 346.03, 248/314, 500, 506, 508; 119/61.54, 119/61.57, 61.5; 403/109.2, 109.3, 233
See application file for complete search history.

(56) References Cited

U.S. PATENT DOCUMENTS

| | | | |
|---|---|---|---|
| 571,624 A * | 11/1896 | Ryan | E02D 5/801 52/157 |
| 2,142,647 A * | 1/1939 | Heller | A24F 19/0071 248/150 |
| 2,453,565 A * | 11/1948 | Barden | A63B 55/50 248/96 |
| 2,623,369 A * | 12/1952 | Haydu | A47G 19/10 248/362 |
| 4,205,629 A * | 6/1980 | Wix | A01K 5/0114 119/51.5 |
| 4,850,564 A * | 7/1989 | Padin | E04H 12/2223 248/533 |
| 4,896,651 A * | 1/1990 | Kott, Jr. | F24B 1/205 126/30 |
| 4,976,223 A * | 12/1990 | Pierce | A01K 5/0114 119/61.56 |
| 5,050,828 A * | 9/1991 | Wolff | E04H 12/2215 248/156 |
| 5,135,192 A * | 8/1992 | Winkler | E04H 12/2223 248/156 |
| 5,148,626 A * | 9/1992 | Haake, Sr. | A01K 5/0142 119/61.53 |
| 5,526,773 A | 6/1996 | Richardson | |
| 5,628,276 A * | 5/1997 | Raposa | A01K 5/0114 119/61.54 |

(Continued)

*Primary Examiner* — Terrell L McKinnon
*Assistant Examiner* — Michael McDuffie
(74) *Attorney, Agent, or Firm* — Southeast IP Group, LLC.; Thomas L. Moses

(57) ABSTRACT

A pet food and water receptacle anchoring system includes an anchor that is fixed on an underside of the food/water receptacle. In a preferred embodiment, the anchor comprises a head member on an upper portion and a screw member on a lower portion. The anchor may be screwed downwardly into any surface, or alternatively into a sleeve that is secured into a cement surface. Preferably, the anchor includes a ground plate to provide further stabilization to the receptacle when secured to a surface.

13 Claims, 12 Drawing Sheets

(56) References Cited

U.S. PATENT DOCUMENTS

| | | | |
|---|---|---|---|
| 6,820,379 B1* | 11/2004 | Krinner | E04H 12/2223 |
| | | | 108/156 |
| 7,353,775 B1* | 4/2008 | Stelmach | A01K 1/04 |
| | | | 119/61.54 |
| 7,484,477 B2* | 2/2009 | Wojcik | A01K 1/04 |
| | | | 119/51.01 |
| 8,146,533 B2 | 4/2012 | Beltezore et al. | |
| 8,800,493 B2* | 8/2014 | Harding | A01K 5/0142 |
| | | | 119/61.57 |
| 9,930,865 B1* | 4/2018 | Hunt | A01K 5/0114 |
| 10,008,134 B2* | 6/2018 | Pura | G09F 7/22 |
| 10,180,152 B2* | 1/2019 | Green | A01K 7/005 |
| 10,624,482 B2* | 4/2020 | Boak | A01K 39/014 |
| 2002/0121580 A1* | 9/2002 | Grady | A47G 29/1216 |
| | | | 248/146 |
| 2004/0231607 A1* | 11/2004 | Hollinger | A01K 5/0135 |
| | | | 119/61.54 |
| 2006/0249089 A1 | 11/2006 | Behunin | |
| 2010/0170447 A1* | 7/2010 | Pridgen, Jr. | A01K 5/0128 |
| | | | 119/61.53 |
| 2011/0041772 A1 | 2/2011 | Hargrove | |
| 2011/0303806 A1* | 12/2011 | Samaras | A01M 31/06 |
| | | | 248/156 |
| 2013/0255583 A1 | 10/2013 | Miller, Sr. et al. | |
| 2015/0308615 A1* | 10/2015 | Neaves | A01K 5/0114 |
| | | | 119/61.57 |

* cited by examiner

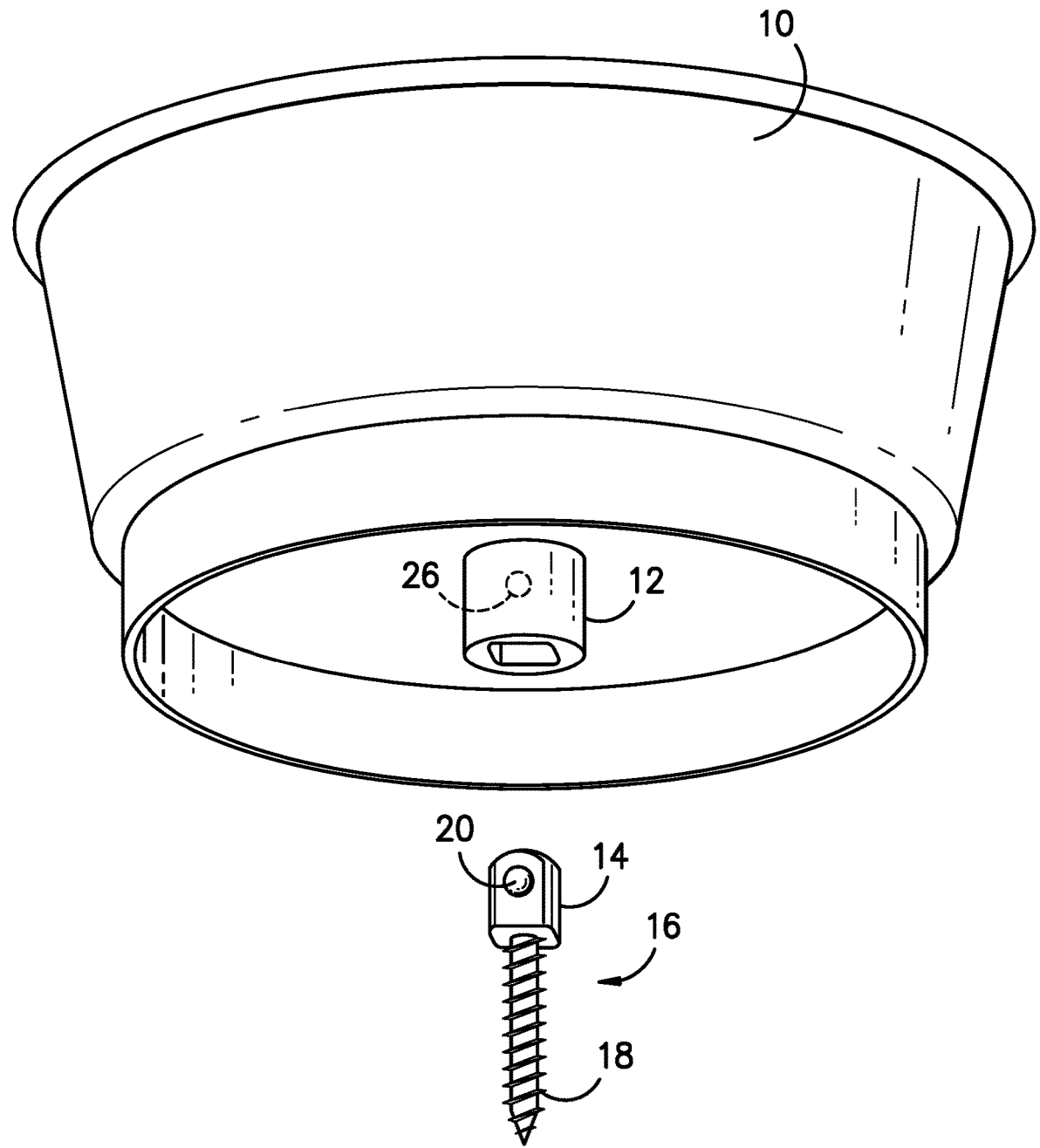
FIG. -1-

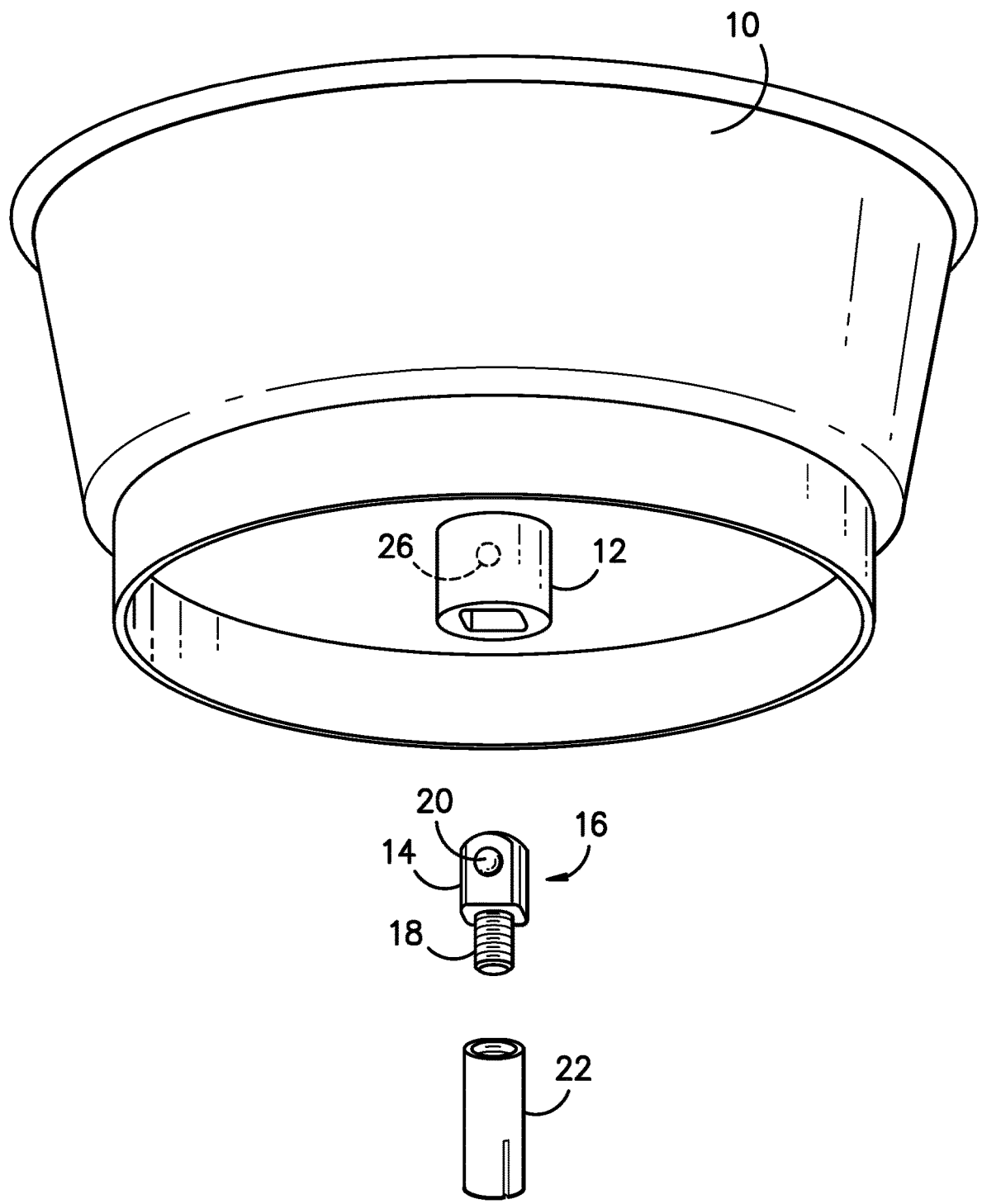
FIG. -2-

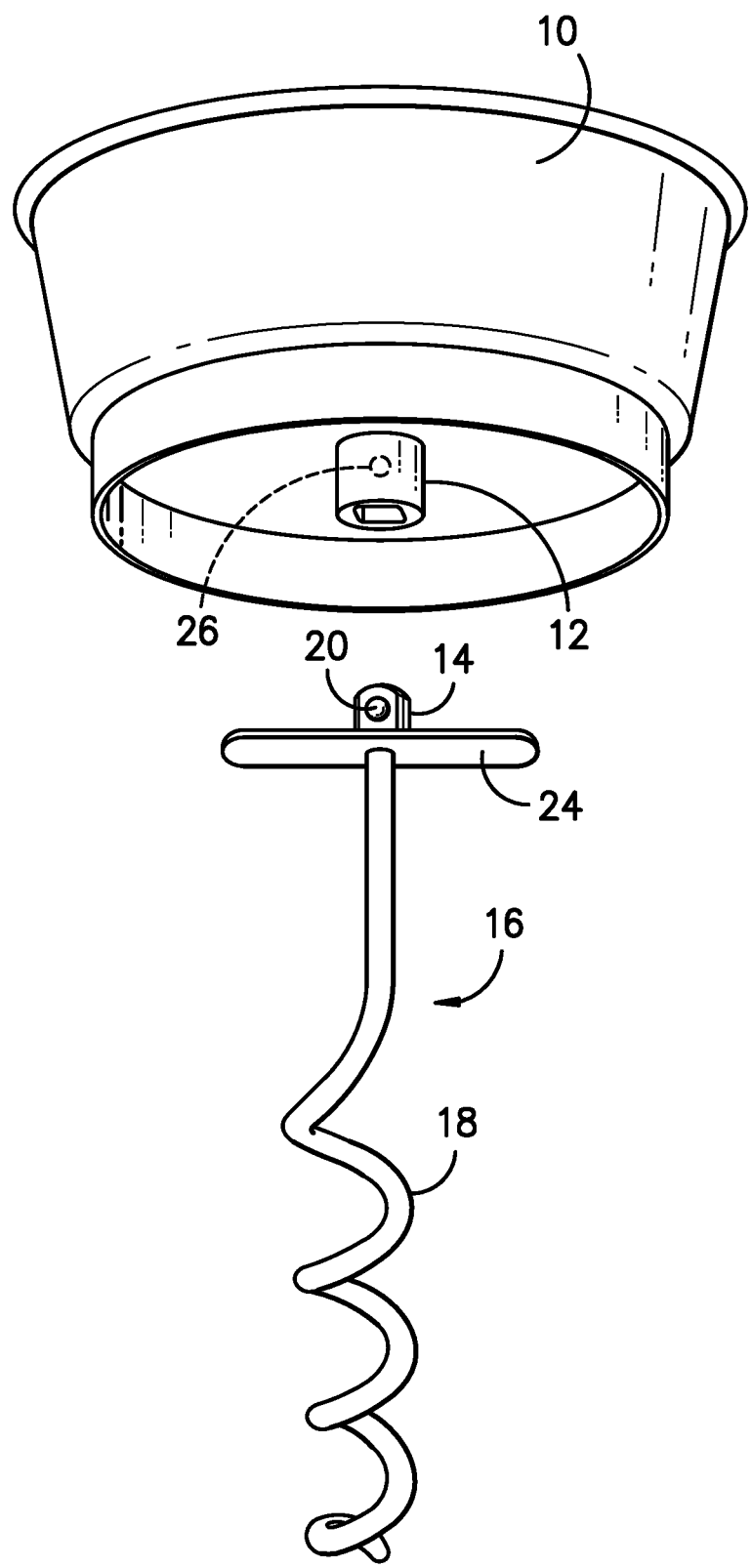
FIG. -3-

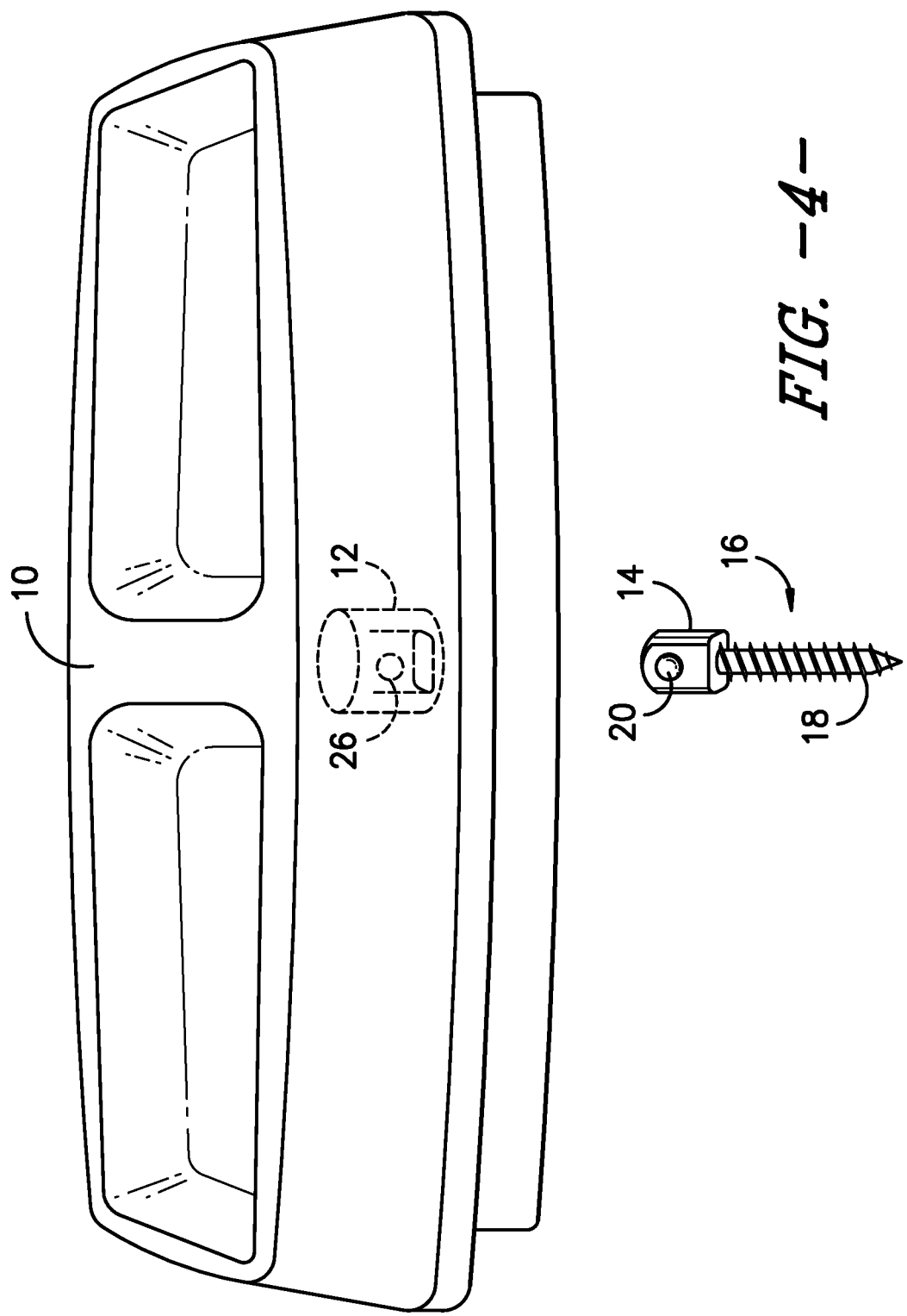

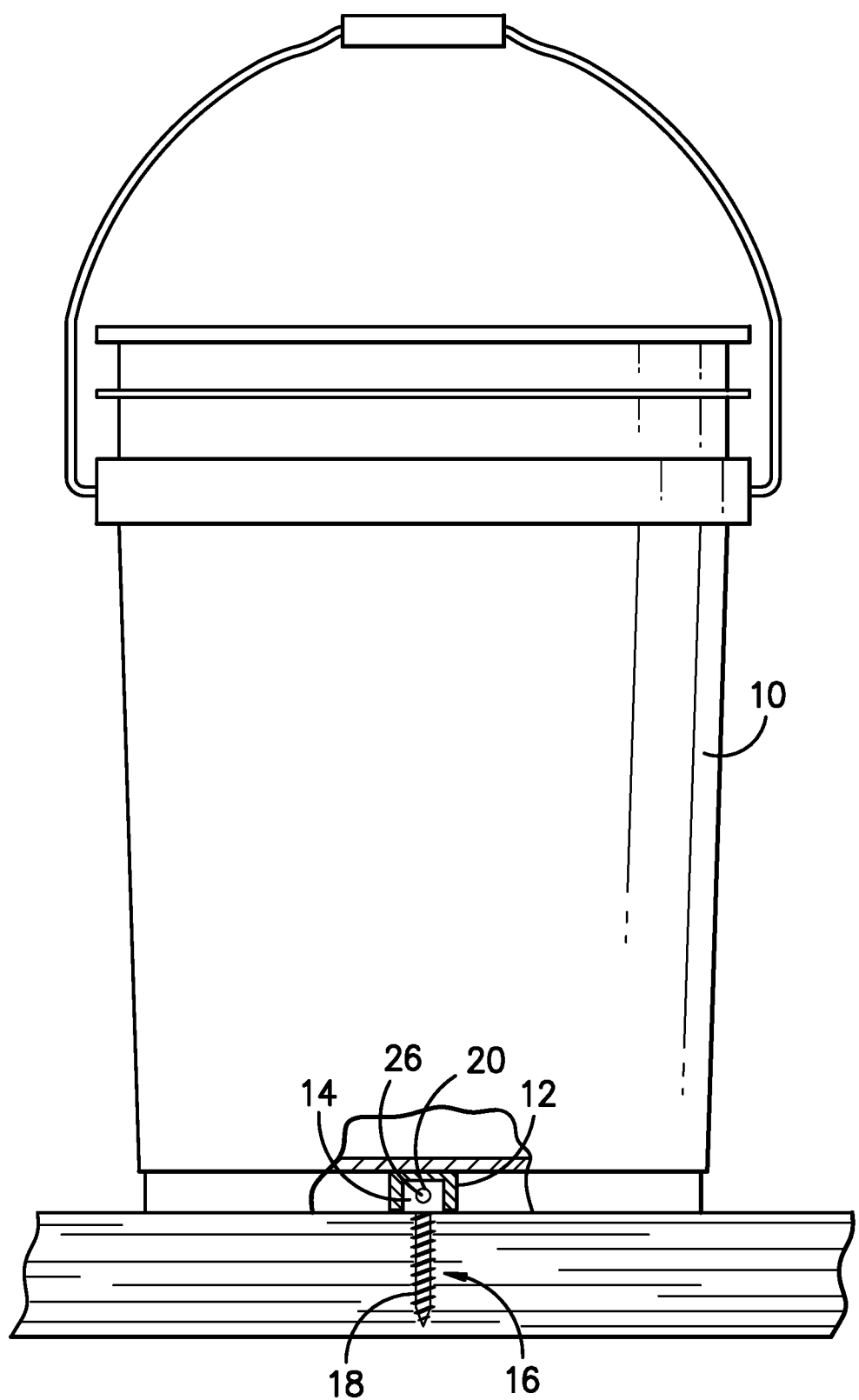
FIG. -5-

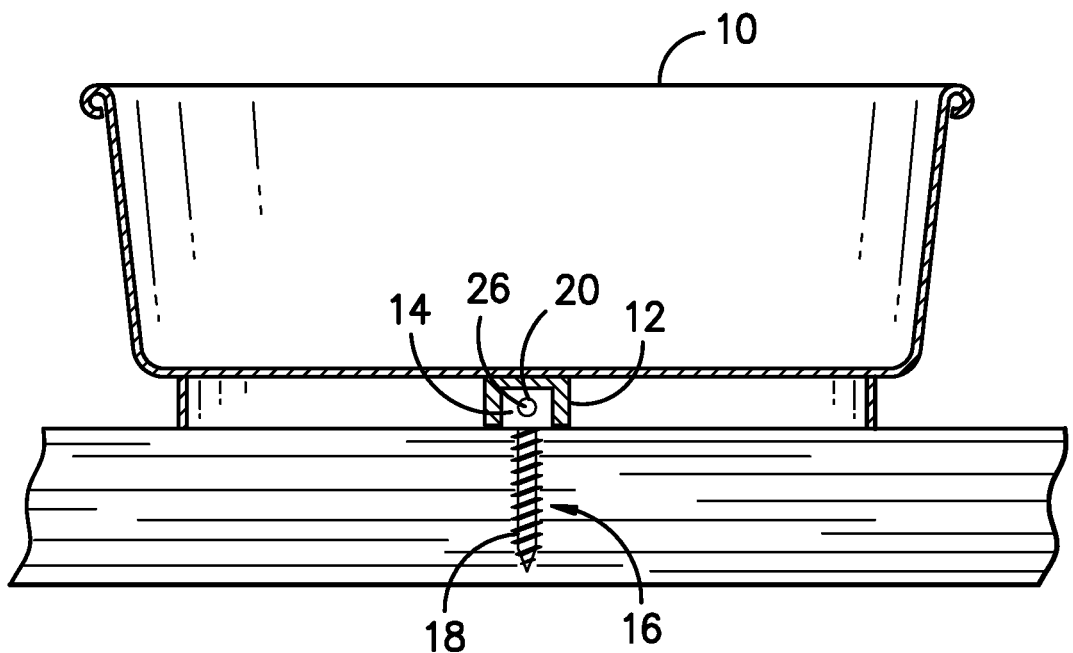
FIG. -6-
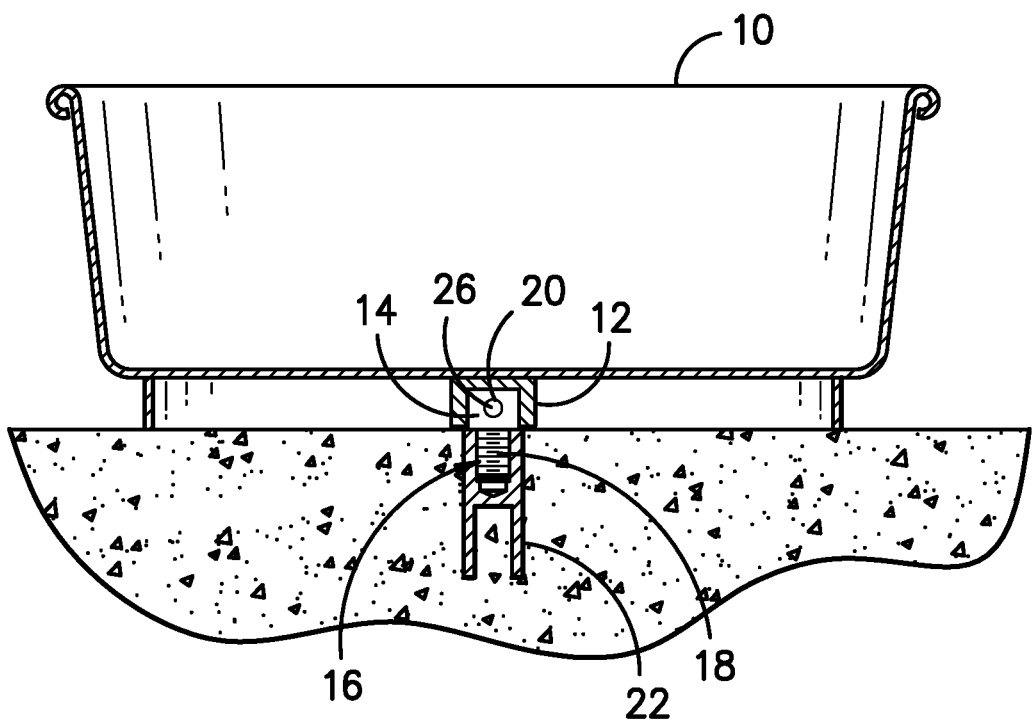
FIG. -7-

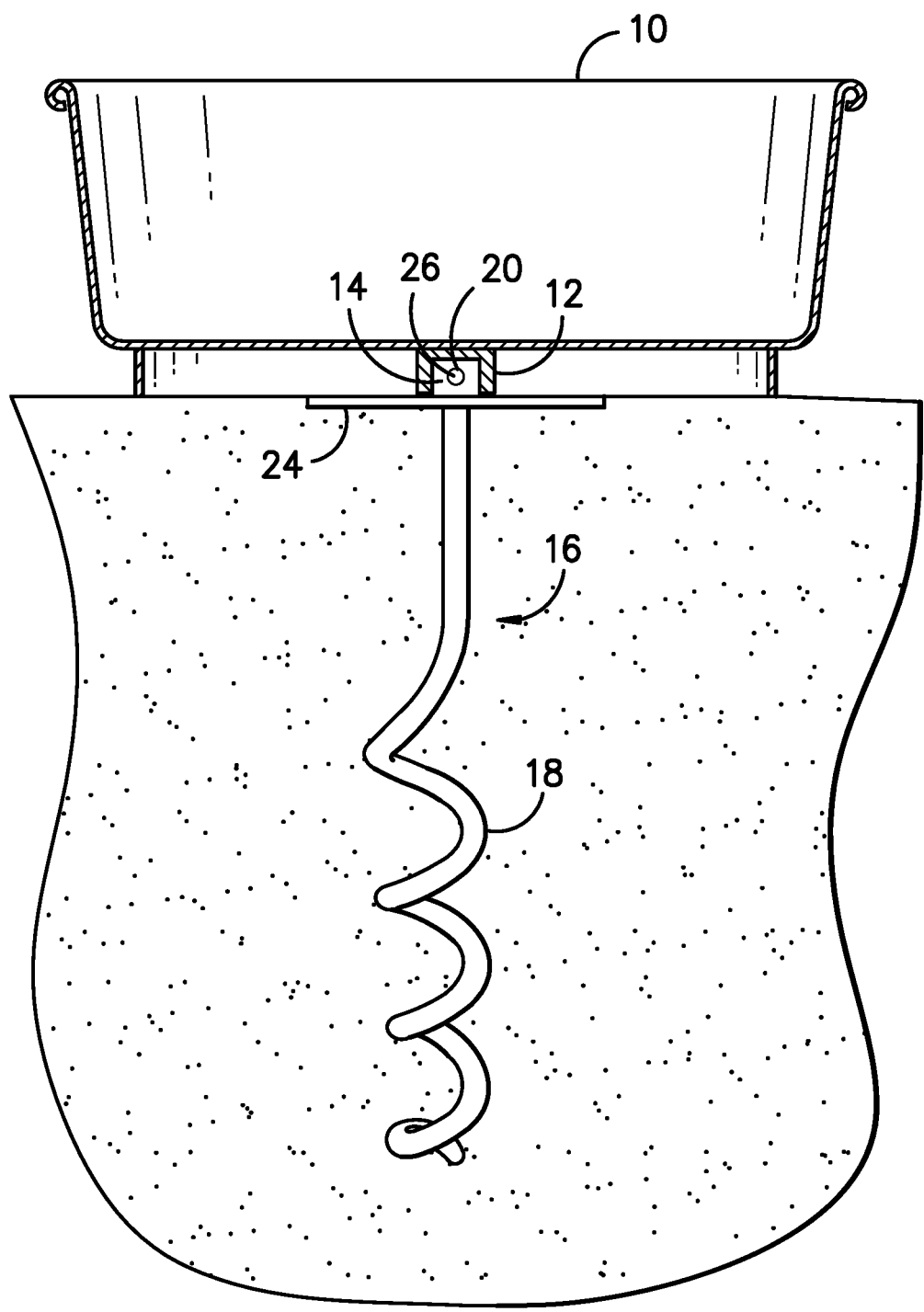
FIG. -8-

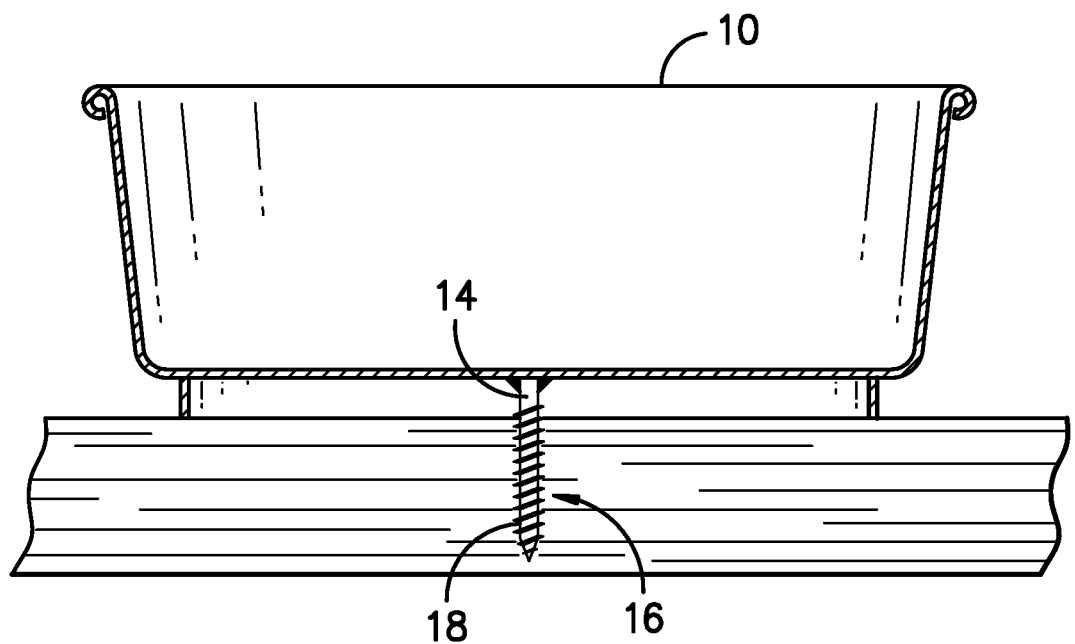
FIG. -9-
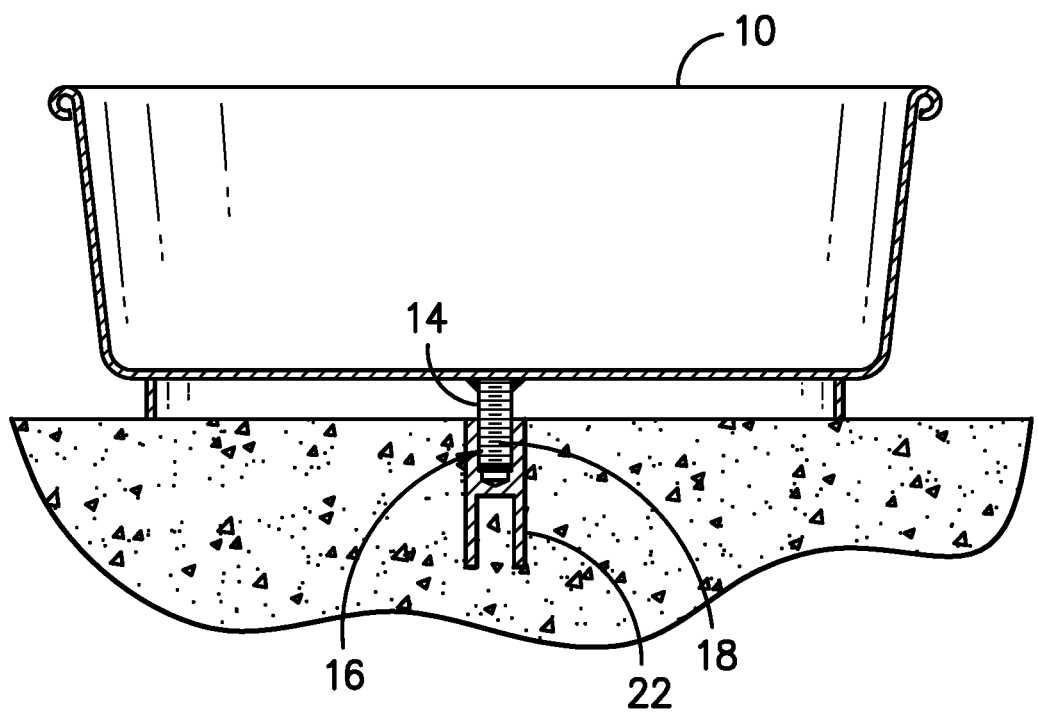
FIG. -10-

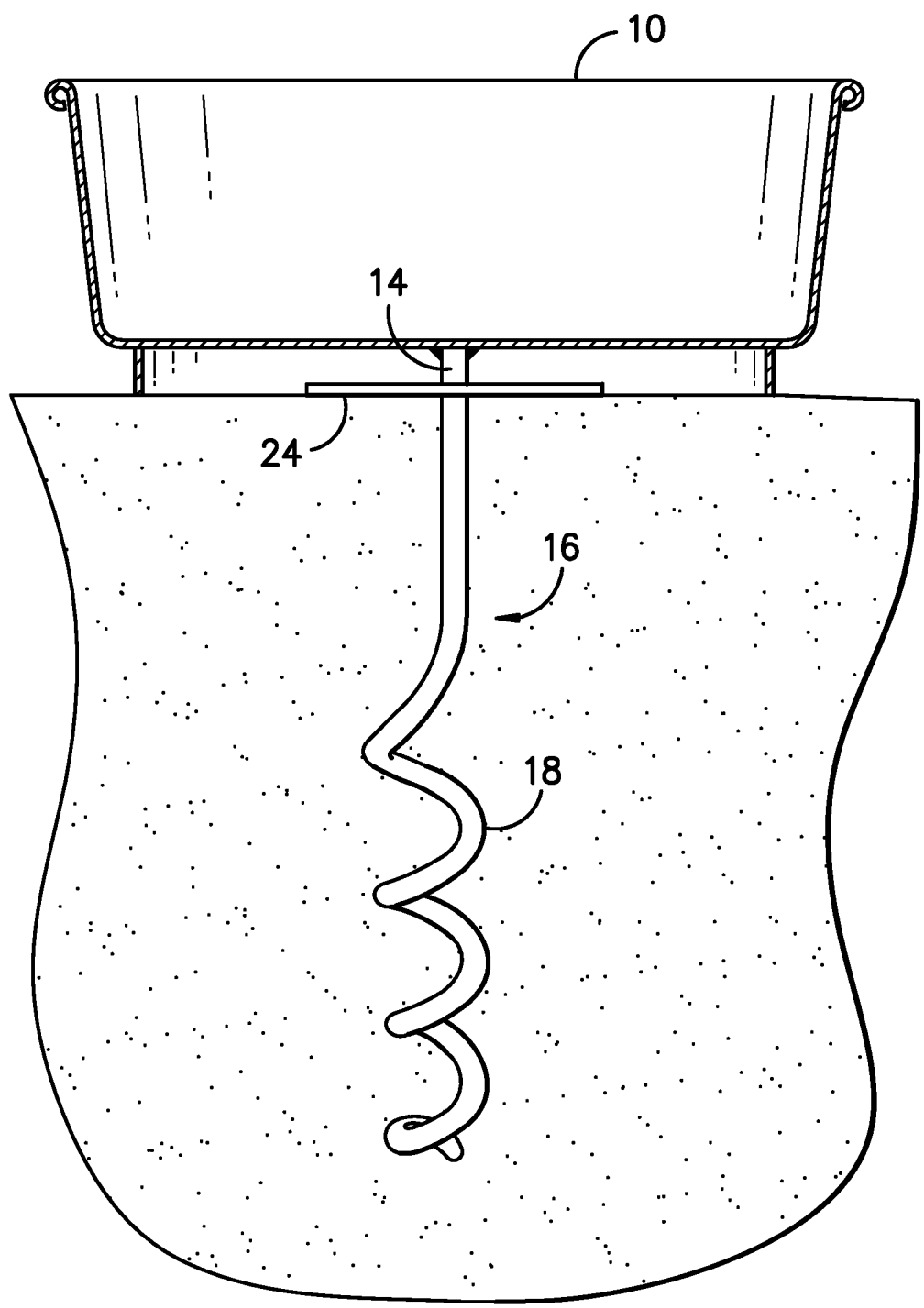
FIG. -11-

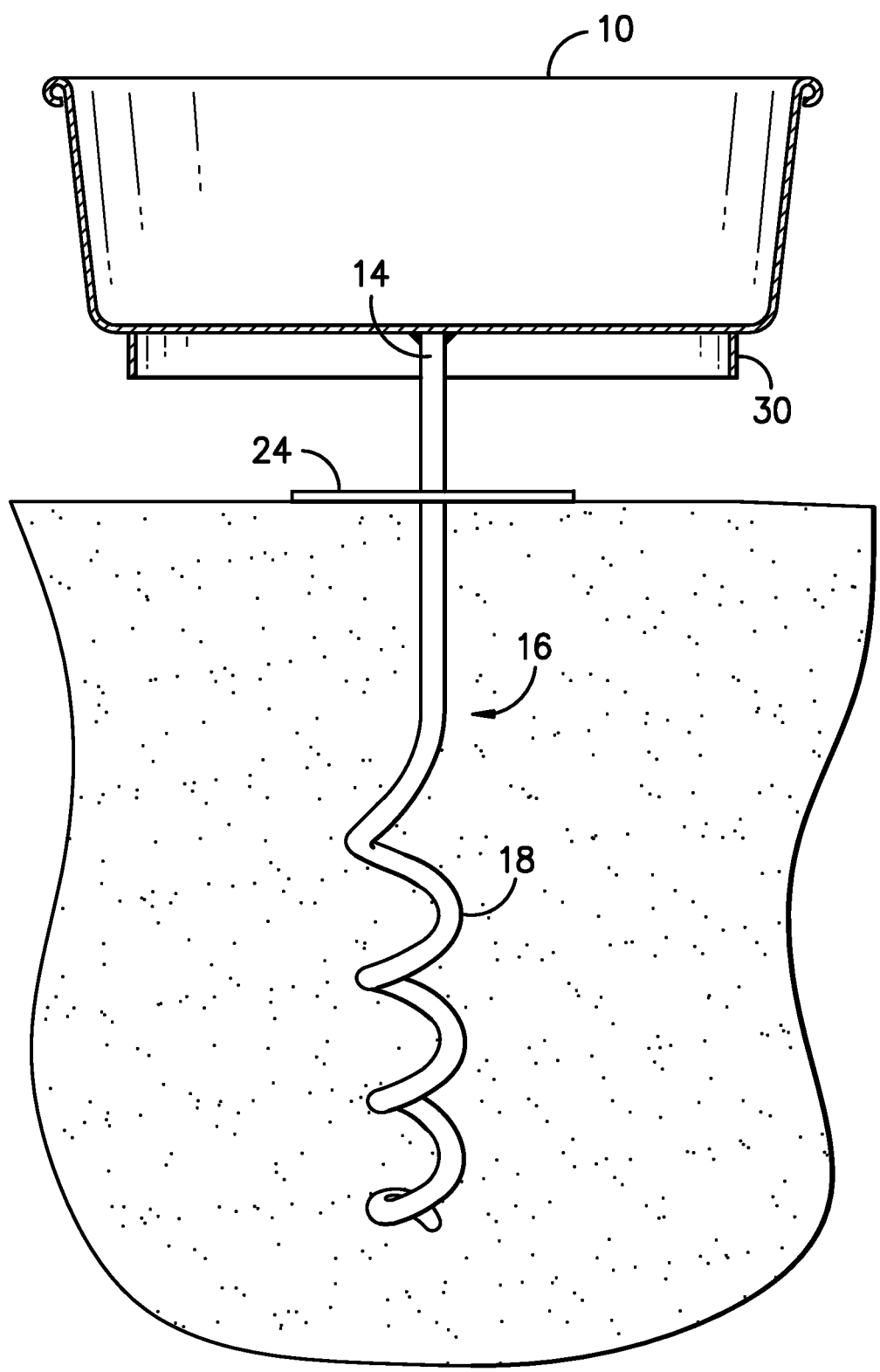
FIG. -12-

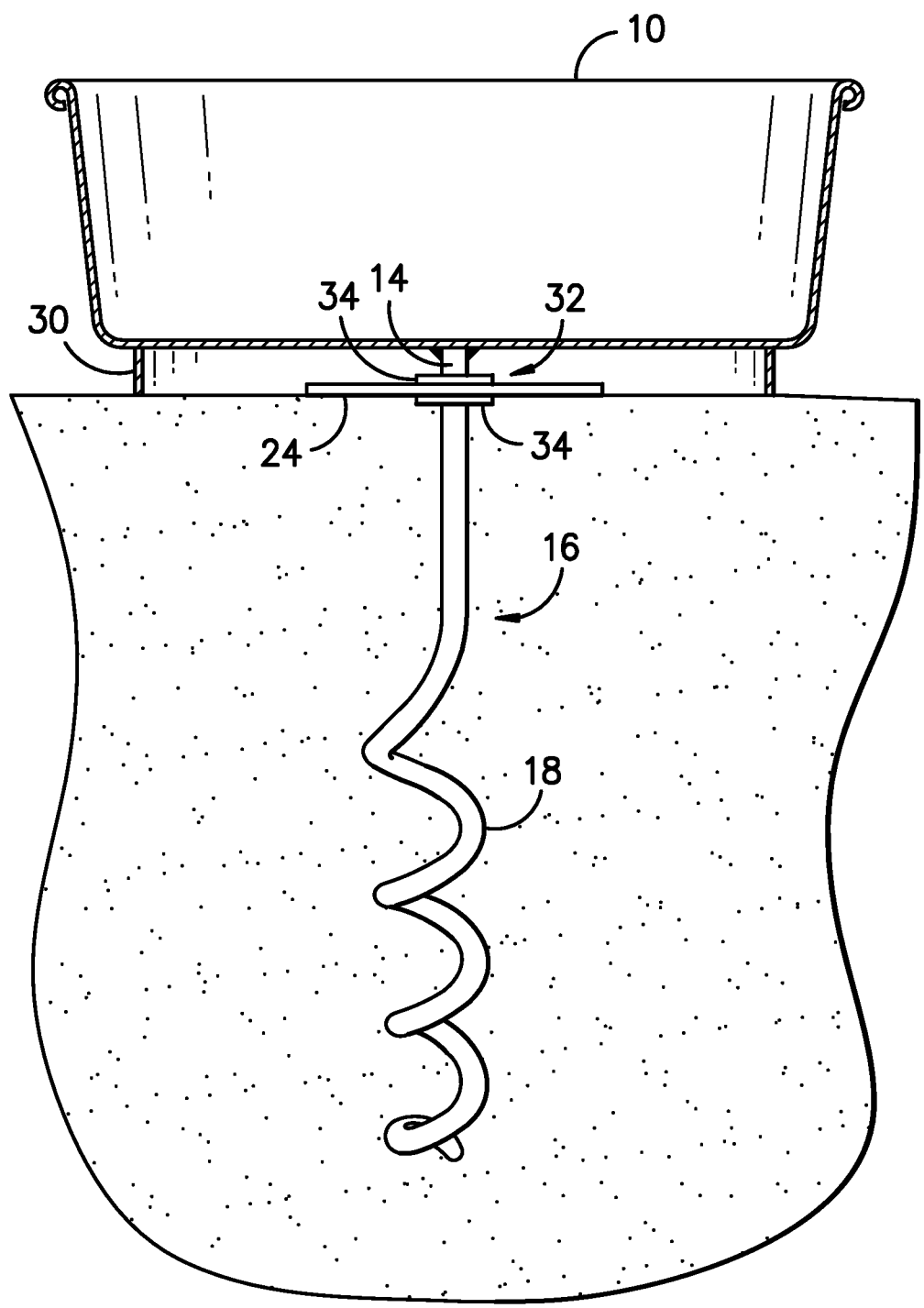
FIG. -13-

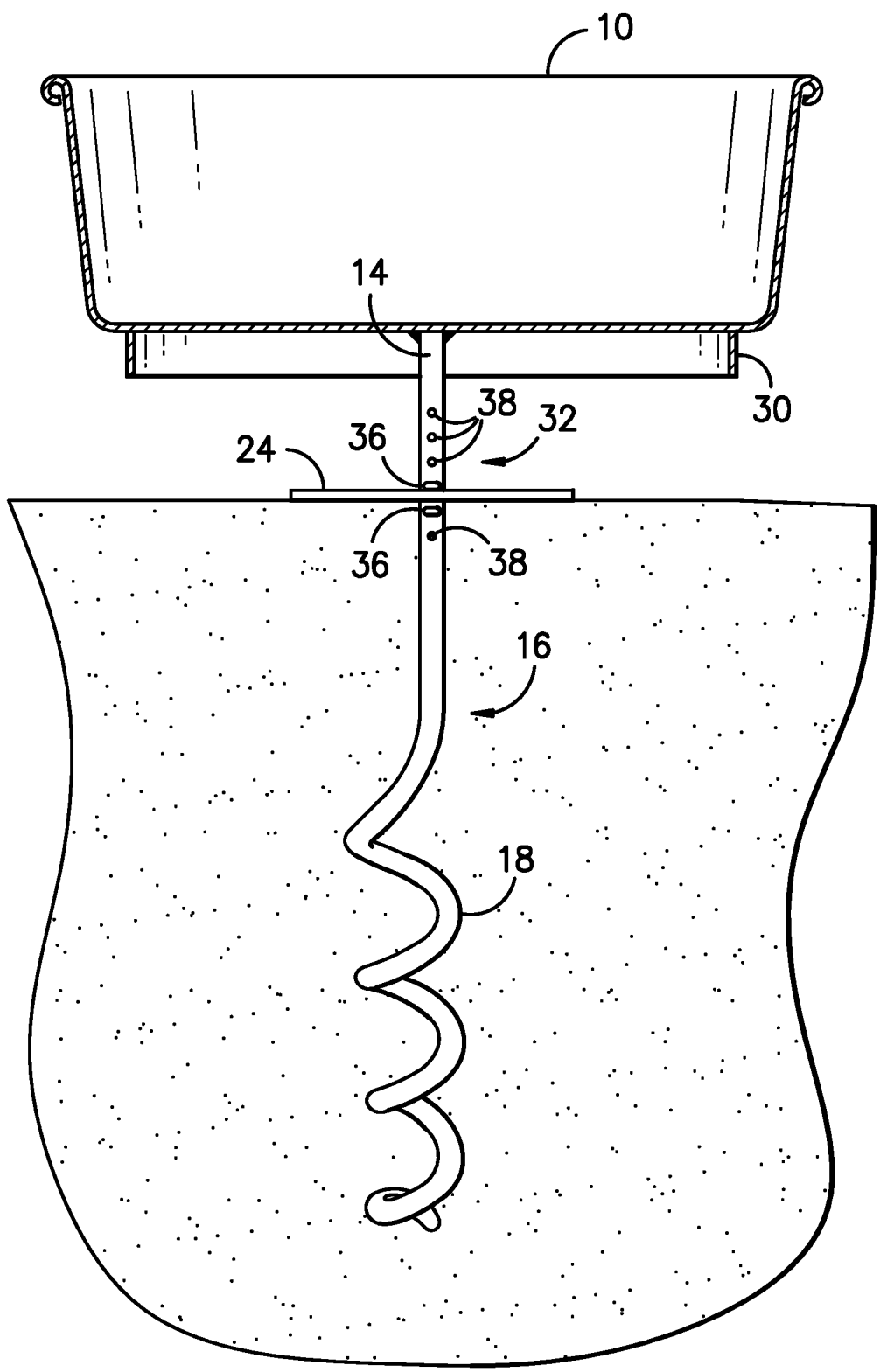
FIG. -14-

PET FOOD RECEPTACLE ANCHOR SYSTEM AND METHOD

CROSS-REFERENCE TO RELATED APPLICATIONS

The present application is a continuation-in-part of U.S. application Ser. No. 15/408,547, entitled PET FOOD RECEPTACLE ANCHOR SYSTEM AND METHOD, filed on Jan. 18, 2017. The foregoing application is hereby incorporated by reference in its entirety.

BACKGROUND OF THE INVENTION

Field of the Invention

The present invention relates to a system and method for anchoring a pet food bowl or receptacle on various types of surfaces, in order to prevent the food receptacle from becoming overturned or inadvertently moved while the pet is feeding from the receptacle. More specifically, the present invention includes, in one embodiment, an anchor that may be secured into a wood surface, concrete surface, dirt surface, or other type of terrain or surface, wherein the anchor is attached to an underside of a pet food or water receptacle.

Description of the Prior Art

Other types of devices have been devised to prevent spillage or overturning of pet food and water receptacles. The references listed below are hereby incorporated herein by reference, in their entireties:

U.S. Pat. No. 5,526,773

A three-piece pet food water dish assembly is capable of withstanding spillage and inhibits the ability of crawling insects to access the food and water containers. The invention incorporates a feeder component with one or more container sections that is insertable into a holder component that itself is anchored to the ground. The holder component structure further incorporates an internal annular trench that, when filled with water, prevents access to the surrounded feeder component by crawling insects. The assembly allows for easy insertion and removal of the feeder component from the holder component in a manner that facilitates the addition or removal of food and water for the pet. The holder component structure allows for the ease of insertion and removal of the feeder component while still maintaining its isolation from the ground and crawling insects through means of the annular trench and still maintaining its stability through its nearly complete enclosure by the holder component.

US Patent Application No. 2013/0255583

A food/water bowl for pets that can be secured to the ground. The invention comprises a plastic housing having bilaterally spaced, dual food/water compartments. A stake member is provided for securing the plastic housing to the ground. The stake member may be helical shaped to facilitate insertion of the stake member into the ground and to provide enhanced stability so that the food/water contents do not get wasted from tipping of the container. The stake member and the housing are easily separable for convenience in portability and storage when not needed for feeding the pet.

US Patent Application No. 2011/0041772

A vessel for holding and presenting solids, liquids or both, including a vessel body having a base portion and at least one wall member extending from the base portion and defining at least one cavity for containing solids, liquids or both; a stabilizer including a stabilizer body for ground engagement; and a fastener assembly for releasably retaining the body and the stabilizer in a mated relationship, the fastener including a first fastener portion mounted to the vessel body and a second fastener portion mounted to the stabilizer in a configuration for mating with the first fastener portion when the second fastener portion is closely adjacent a ground surface with the stabilizer body extending into the ground.

US Patent Application No. 2006/0249089

A spill-proof pet dish has a rigid mounting shaft with one of several height adjustable attaching means. A threaded lag bolt end of the shaft attaches to a flat support surface, such as a floor, deck, or patio. A corkscrew device at the end of the shaft for outdoor use screws into the ground. An L-shaped shaft with a clamp on the horizontal leg mounts to vertical elements, such as fence posts. A square Y-shaped shaft with two ramped locking mechanisms supports two pet bowls. A ramped locking mechanism at the top of the shaft removably locks in place a T-shaped locking post attached to the recessed bottom of the pet bowl for removable cleaning or remote refilling of the bowl.

Each of these devices suffers from disadvantages, and it would be desirable to provide a pet food and water receptacle anchor system that is easy to use, inexpensive to manufacture, and which is effective in anchoring the receptacles in various types of surfaces and terrain.

BRIEF SUMMARY OF THE INVENTION

In accordance with one aspect of the invention, a pet food and water receptacle anchoring system includes an anchor that is affixed on an underside of the food/water receptacle. In a preferred embodiment, the anchor comprises a head member and a screw member, wherein the head member is fixed to the receptacle so that it may not be removed. The anchor may be screwed downwardly into a wood surface, or alternatively into a sleeve that is secured into a cement surface. For these purposes, it is contemplated that the screw member is either a wood screw (for securing into a wood surface), or a machine screw (for securing into a threaded sleeve that is driven and secured into a concrete surface). Alternatively, the screw member may comprise a corkscrew type of mechanism, which may be screwed into a ground surface (dirt, grass, or the like).

In a preferred embodiment, the receptacle also includes a lip around the underside thereof which can help stabilize the bowl when the screw member is secured into a surface. As an aid to stability, the anchor can also include a ground plate. The ground plate is preferably positioned so that both the lip and the ground plate can contact the surface into which the anchor system is affixed. Alternatively, the ground plate may be positioned lower than the bottom of the lip, thereby elevating and securing the receptacle above the surface to which the anchor system is affixed.

In additional embodiments, the ground plate may be adjustable along the length of the anchor shaft and be secured with a securing mechanism. Examples of the securing mechanism may include a pair of rubber grommets above and below the ground plate, where the grommets frictionally engage the shaft of the anchor. Alternatively, the anchor shaft may define a series of holes, and locking pins may be inserted through the holes on either side of the ground plate to lock it in place.

BRIEF DESCRIPTION OF THE DRAWINGS

These and other features, aspects, and advantages of the present invention will become better understood with regard to the following description, appended claims, and accompanying drawings where:

FIG. 1 is a perspective exploded view of one embodiment of a pet food or water receptacle having an anchor receiver on an underside thereof, and further showing an anchor preferably used for wood surfaces, which includes an anchor head on an upper portion thereof and a wood screw portion on a lower portion thereof;

FIG. 2 is a perspective exploded view of one embodiment of a pet food or water receptacle having an anchor receiver on an underside thereof, and further showing an anchor preferably used for concrete surfaces, which includes an anchor head on an upper portion thereof and a machine screw, and further shows a threaded sleeve to receive the machine screw portion of the anchor, wherein the threaded sleeve is adapted to be inserted and anchored into a concrete surface;

FIG. 3 is a perspective exploded view of one embodiment of a pet food or water receptacle having an anchor receiver on an underside thereof, and further showing an anchor preferably used for dirt or ground surfaces, which includes an anchor head on an upper portion thereof, a flat ground plate below the anchor head, and a corkscrew portion below the flat ground plate for insertion into the ground;

FIG. 4 is a perspective exploded view of one embodiment of a pet food and water receptacle having two separate bowls, wherein the receptacle includes an anchor receiver on an underside thereof, and further showing an anchor that is adapted to be received by the anchor receiver, wherein the anchor includes an anchor heat on a top portion thereof, and includes a screw portion on a lower portion thereof;

FIG. 5 is a side cutaway view showing a bucket having an anchor receiver on an underside thereof, and further showing an anchor, wherein the anchor head is engaged within the anchor receiver, and the screw portion of the anchor is secured within a wood surface;

FIG. 6 is a side cross-sectional view of a pet food or water receptacle, wherein the receptacle includes an anchor receiver on an underside thereof, and further showing an anchor, wherein the anchor head is engaged within the anchor receiver, and the screw portion of the anchor is secured within a wood surface;

FIG. 7 is a side cross-sectional view of a pet food or water receptacle, wherein the receptacle includes an anchor receiver on an underside thereof, and further showing an anchor, wherein the anchor head is engaged within the anchor receiver, and the screw portion of the anchor is fully engaged within a threaded sleeve that is secured in a concrete surface;

FIG. 8 is a side cross-sectional view of a pet food or water receptacle, wherein the receptacle includes an anchor receiver on an underside thereof, and further showing an anchor, wherein the anchor head is engaged within the anchor receiver, and the corkscrew portion of the anchor is fully engaged within a ground surface so that the ground plate is flush with the surface of the ground;

FIG. 9 is a side cross-sectional view of a pet food or water receptacle, wherein the receptacle includes an anchor affixed via its anchor head on an underside thereof, and wherein the screw portion of the anchor is secured within a wood surface;

FIG. 10 is a side cross-sectional view of a pet food or water receptacle, wherein the receptacle includes an anchor affixed via its anchor head on an underside thereof, and wherein the screw portion of the anchor is fully engaged within a threaded sleeve that is secured in a concrete surface;

FIG. 11 is side cross-sectional view of a pet food or water receptacle, wherein the receptacle includes an anchor affixed via its anchor head on an underside thereof, and wherein the corkscrew portion of the anchor is fully engaged within a ground surface so that the ground plate and lip of the receptacle is contacting the surface of the ground;

FIG. 12 is side cross-sectional view of a pet food or water receptacle, wherein the receptacle includes an anchor affixed via its anchor head on an underside thereof, and wherein ground plate is disposed a distance below the anchor head so that when the corkscrew portion is fully engaged within a ground surface, the receptacle is elevated above the ground;

FIG. 13 is side cross-sectional view of a pet food or water receptacle, wherein the receptacle includes an anchor affixed via its anchor head on an underside thereof, and wherein ground plate is adjustable and fixed in position by two rubber grommets; and FIG. 14 is side cross-sectional view of a pet food or water receptacle, wherein the receptacle includes an anchor affixed via its anchor head on an underside thereof, and wherein ground plate is adjustable and fixed in position by locking pins.

DETAILED DESCRIPTION OF THE INVENTION

The present invention includes, in a first embodiment, a pet food/water receptacle 10 having an anchor receiver 12 on an underside thereof. The anchor receiver 12, in a preferred embodiment, is shaped similarly to a ratchet socket, wherein the anchor receiver is a generally round member defining a hole therein that includes a generally square shape for receiving a male anchor head 14 member.

The anchor member 16 includes an anchor head 14 on an upper portion thereof, and a screw member 18 extending downwardly from the anchor head 14. In a preferred embodiment, the anchor head 14 includes a square cross-section (as viewed from above), and further includes a spring-loaded ballbearing 20 extending slightly outwardly from one side thereof. The screw member 18 can take several forms. For use on a wood surface, the screw member 18 may take the shape of a wood screw. For use on a concrete surface, the screw member 18 may take the form of a machine screw that engages a threaded sleeve 22 that is secured into the concrete surface. For use on a ground surface (dirt, grass, or the like), the screw member 18 may take the form of a corkscrew mechanism that may be screwed into the ground. In a preferred ground-use embodiment, a flat ground plate 24 may be disposed between the anchor head 14 and the corkscrew mechanism 18, as shown. It is contemplated that a drill, ratchet, hand wrench, or other like tool may be used to insert the screw member into a surface, or to remove the screw member therefrom.

Preferably, at least one inner side of the anchor receiver 12 (and more preferably, all inner sides thereof) include a slight indentation 26 that engages the spring-loaded ballbearing 20 that is disposed on one side of the anchor head 14. In this way, while the anchor head 14 is being inserted into the anchor receiver 12 on the bottom side of the food/water receptacle 10, the spring-loaded ballbearing 20 is forced inwardly until the anchor head 14 is fully inserted into the anchor receiver 12. At the point of full insertion, the spring-loaded ballbearing 20, which is biased outwardly by the spring, extends into the indentation 26 on the inside wall of the anchor receiver 12, in order to provide a snap-fit mechanism. Such mechanisms are commonly found on ratchets for the snap-fit attachment of a socket to the ratchet.

In use on a wood surface, a user simply screws the anchor member 16 into the wood surface, and then places the pet food/water receptacle 10 onto the surface so that the anchor head 14 is fully received by and snaps into the anchor receiver 12. Similarly, for use on a ground surface (dirt, grass, and the like), a user simply screws the corkscrew 18 into the ground, and then removably attaches the food/water receptacle 10 to the anchor member 16 in snap-fit fashion, as noted above. For use on a concrete surface, a threaded metal sleeve 22 is affixed into the concrete, and the anchor member 16 is simply screwed into the sleeve 22. Then the food/water receptacle 10 is removably affixed thereto. Any standard drill may be used to screw the anchor member 16 into the surface, if desired.

It should be understood that the anchor head 14 and anchor receiver 12 may be made of any shape or size, so long as they fit together in complementary fashion, and preferably in such a way that prevents the receptacle 10 from spinning or rotating about the anchor member 16. Further, it should be understood that any type of food/water receptacle 10 may be used, including single bowl dishes, multiple bowl devices, water buckets, or any other desired receptacle. Additionally, it is contemplated that the anchor system described herein may be used on other things or devices, beyond pet food/water receptacles.

Advantageously, the present anchor system allows a person to easily attach the receptacle 10 to the anchor member 16 by setting the receptacle 10 down in a vertical motion from directly above the anchor member 16. Once the receptacle 10 is snap-fit in place on the anchor member 16, it is difficult, if not impossible for a dog or other pet to dislodge the receptacle 10 from the anchor member 16, because such dislodgement may only occur by lifting the bowl or receptacle 10 directly upwardly to disengage the receptacle 10 from the anchor member 16.

In further embodiments, the anchor member 16 may be attached to the receptacle 10 so that it is not removable therefrom as in FIGS. 9-14, that is the anchor 16 may be fixed to the receptacle 10 via welding or being integrally formed, or may be fixed together in any suitable manner. In such an embodiment, the anchor head 14 is affixed directly to the receptacle 10 on either the underside or some other portion. In this embodiment, the system requires no anchor receiver 12, spring loaded ballbearing 20, and/or indentation 26. However, the screw member 18 may still be in the form of a wood screw, machine screw, or corkscrew form and a ground plate 24, as in FIGS. 9, 10, and 11-14 respectively.

The system may also include a ground plate 24 disposed transversely at a point along the length of the anchor member 16 at a distance to allow the lip 30 to contact the surface into which the anchor member is engaged with a ground surface, providing additional stability as shown in FIG. 11. Alternatively, distance between the anchor head 14 and the ground plate 24 may be such that the receptacle 10 is elevated above the ground as in FIG. 12, providing easier access to taller animals.

In another embodiment, the ground plate 24 may be adjustable along the length of the anchor member 16 as in FIGS. 13 and 14. Embodiments with an adjustable ground plate 24 may also include an adjustable securing mechanism 32. In one embodiment, the adjustable securing mechanism 32 may comprise at least one rubber grommet 34 which frictionally engages the anchor member 16 and prevents the ground plate 24 from moving when the screw member 18 is secured in the ground, as in FIG. 13. Likewise, in another embodiment, the adjustable securing mechanism 32 may comprise at least one hole 38 in the anchor member through which a locking pin 36 can inserted to secure the ground plate 24 when the screw member 18 is secured in the ground, as in FIG. 14. In addition to an element of the adjustable securing mechanism 32 being located on only one side of the ground plate 24, one may also be located on both sides, securing the ground plate 24 even when it is not secured in the ground, as also seen in FIGS. 13 and 14.

When engaged, the adjustable securing mechanism 32 holds the ground plate 24 in place. However, when a user desires to change the location of the ground plate 24 relative to the anchor member 16, the adjustable securing mechanism 32 may be disengaged and reengaged at a new location. While the above embodiments discuss rubber grommets 34 and locking pins 36, there are many means for providing such adjustable securement, and one skilled in the art will recognize that any suitable means for providing such may be employed.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A receptacle anchor system comprising:
   a container having an open top and a bottom member;
   an anchor member fixed on an underside of said bottom member;
   said anchor member including a screw member on a bottom portion thereof opposite a top portion formed with said bottom member;
   a ground plate disposed along said anchor member between said top portion and said screw member;
   an adjustment mechanism for adjustably positioning said ground plate along said anchor member, wherein said adjustment mechanism comprises a first rubber grommet disposed along said anchor member between said ground plate and said top portion to secure said ground plate when said screw member is screwed into a surface;
   a second grommet disposed along said anchor member between said ground plate and said screw member to secure said ground plate; and
   wherein said anchor member may be screwed into a surface, so said container may be removably affixed to said surface.

2. The receptacle anchor system set forth in claim 1, wherein said anchor member is located generally in the center of said bottom surface.

3. The receptacle anchor system set forth in claim 1, wherein said screw member of said anchor member is formed in the shape of a wood screw with a point at a bottom end thereof.

4. The receptacle anchor system set forth in claim 1, wherein said screw member of said anchor member is in the shape of a corkscrew for anchoring said anchor member into ground.

5. The receptacle anchor system set forth in claim 1, wherein said adjustment mechanism comprises a series of openings defined along said anchor member and at least one pin to be inserted through said openings to secure said ground plate to said anchor member.

6. The receptacle anchor system set forth in claim 1, further including a lip protruding from a perimeter of said bottom member of said receptacle.

7. The receptacle anchor system set forth in claim 6, wherein said ground plate is positioned so that said receptacle is elevated above said surface.

8. The receptacle anchor system set forth in claim 6, wherein said ground plate and said lip are disposed in a planar relationship, so that said ground plate and said lip both come into contact with said surface when said anchor is fully engaged therein.

9. The receptacle anchor system set forth in claim 1, wherein said screw portion of said anchor member is in the shape of a machine screw; and
   said system further including a threaded sleeve that may be inserted into a concrete surface, wherein said screw portion may be screwed into said threaded sleeve for securement of said anchor member to said concrete surface.

10. A receptacle anchor system comprising:
   a container having an inner portion and outer portion;
   an anchor member fixed on an outer portion of said container;
   said anchor member including a screw member on a bottom portion thereof opposite a top portion fixed to said container;
   a ground plate disposed along said anchor member between said container and said screw member, wherein said ground plate is adjustable along said anchor member;
   a first rubber grommet positioned at a point along said anchor member between said around plate and said top portion to secure said ground plate when said screw member is screwed into a surface;
   a second rubber grommet disposed at a point along said anchor member between said ground plate and said screw member to secure said ground plate thereto; and
   wherein said anchor member may be screwed into a surface, so said container may be removably affixed to said surface.

11. The receptacle anchor system of claim 10, wherein said screw member is selected from group consisting of a wood screw, a machine screw, and a corkscrew.

12. The receptacle anchor system set forth in claim 10, further including a locking mechanism comprising openings defined by said anchor member and at least one pin to be inserted through any said opening to secure said ground plate thereto.

13. A receptacle anchor system comprising:
   a container having an open top and a bottom member;
   an anchor member fixed on an underside of said bottom member;
   said anchor member including a screw member on a bottom portion thereof opposite a top portion formed with said bottom member, wherein said screw member of said anchor member is in the shape of a machine screw;
   a threaded sleeve that may be inserted into a concrete surface, wherein said screw member may be screwed into said threaded sleeve for securement of said anchor member to said concrete surface.

* * * * *